US012729142B2

(12) United States Patent
Valdez Rodríguez et al.

(10) Patent No.: US 12,729,142 B2
(45) Date of Patent: Sep. 8, 2026

(54) FLOCULANT FORMULATION BASED ON CHITOSAN COMPATIBLE WITH DISINFECTION PRODUCTS AND METHOD OF PREPARATION

(71) Applicant: INDUSTRIAS VEPINSA S.A. DE C.V., Sinaloa (MX)

(72) Inventors: Nubia Yarazeth Valdez Rodríguez, Sinaloa (MX); Fernando Arturo Rodríguez Gómez, Sinaloa (MX)

(73) Assignee: INDUSTRIAS VEPINSA S.A. DE C.V., Los Mochis (MX)

( * ) Notice: Subject to any disclaimer, the term of this patent is extended or adjusted under 35 U.S.C. 154(b) by 787 days.

(21) Appl. No.: 18/048,165

(22) Filed: Oct. 20, 2022

(65) Prior Publication Data

US 2023/0070956 A1 Mar. 9, 2023

(30) Foreign Application Priority Data

Aug. 26, 2021 (MX) .................... MX/a/2021/010298

(51) Int. Cl.
*C02F 1/52* (2023.01)

(52) U.S. Cl.
CPC .......... *C02F 1/5263* (2013.01); *C02F 1/5272* (2013.01); *C02F 2303/18* (2013.01)

(58) Field of Classification Search
None
See application file for complete search history.

(56) References Cited

U.S. PATENT DOCUMENTS 3,338,828 A 8/1967 Clark
3,446,731 A 5/1969 Harsh
5,433,865 A 7/1995 Laurent
5,543,056 A 8/1996 Murcott et al.
2020/0255307 A1 * 8/2020 Gerfen ...................... C02F 1/24

FOREIGN PATENT DOCUMENTS

CN 105753125 A * 7/2016 ............ C02F 1/5245
WO WO-9002708 A1 * 3/1990 ............ C02F 1/5263

OTHER PUBLICATIONS

Exley, C., "A molecular mechanism of aluminum-induces Alzheimer's disease?", Journal of Inorganic Biochemistry, 76: 133-140 (1999).
Lichtfouse et al., "Chitosan for direct bioflocculation of wastewater", Environmental Chemistry Letters, 17: 1603-1621 (2019).
Yang et al., "A review on chitosan-based flocculants and their applications in water treatment", Elsevier Water Research, 95: 59-89 (2016).
Zargar et al., "A Review on Chitin and Chitosan Polymers: Structure, Chemistry, Solubility, Derivatives, and Applications", ChemBioEng Reviews, 2(3): 204-226 (2014).

* cited by examiner

*Primary Examiner* — Peter Keyworth
(74) *Attorney, Agent, or Firm* — Knobbe, Martens, Olson & Bear, LLP

(57) ABSTRACT

A chitosan-based flocculant has the optimal adjustment of metal salts, alcohols and acids, which allow an all-in-one product to be obtained. A product with compatibility with the main disinfection agents is used in water treatment, which is functional product and is applied in more practical manner, and therefore offers a competitive advantage to end users.

8 Claims, 5 Drawing Sheets

FLOCULANT FORMULATION BASED ON CHITOSAN COMPATIBLE WITH DISINFECTION PRODUCTS AND METHOD OF PREPARATION

FIELD OF THE INVENTION

The present invention is related to the flocculant formulation based on chitosan. In particular, flocculant formulations that are compatible with disinfection products.

BACKGROUND OF THE INVENTION

Flocculants are widely used in industry for drinking water treatment, biomass recovery and wastewater treatment. Flocculation processes consist of neutralizing the charges of the small colloids suspended in the water to subsequently form larger flocs that can be effectively eliminated by sedimentation and/or filtration.

Chitosan is a biopolymer derived from chitin, which is obtained mainly from the exoskeletons of crustaceans, its chemical structure is composed of glucosamine monomers linked by the β (1-4) bond. The functionality of chitosan as a flocculant is derived from the protonation of its amino groups, when found in an acid medium.

Application MX/a/2020/006789, filed by the same applicant as the present invention, describes a flocculant based on chitosan, metal sulphates and acids with improved shelf life and performance for the water treatment. However, said flocculant has the disadvantage that it cannot operate simultaneously with certain disinfection agents, which are commonly necessary in the water treatment process.

Additionally, said application MX/a/2020/006789 proposes a kit with a solid granulated product and a liquid activating solution (FIG. 1*a*) so that the preparation is in site and carried out by the end user of the product. However, said configuration of the product has several disadvantages, such as, for example, that the configuration of the kit, that is, a solid and a liquid product separately, increases the chances of obtaining a poor flocculant due to lack of expertise at the time of preparation by the end user not to mention that improper preparation can result in the formation of precipitates and lumps during dissolution. In addition, the activating solution presents risks in its handling as it is highly corrosive.

Therefore, there is a need for a flocculant that is a single product, that is, that is not formulated separately and that can operate simultaneously with disinfection agents, preserving its improved shelf life without forming precipitates, nor lumps during its preparation and maintaining its compatibility with the guidelines of Standard 60 of the United States National Science Foundation (NSF) regulating the chemical compounds producers to purify drinking water for human consumption.

SUMMARY

Considering the disadvantages of currently available flocculants, it is an object of the present invention to provide chitosan-based flocculants in a single formulation compatible with disinfection agents.

An additional object of present invention is to provide a method for preparing a unique flocculant formulation based on chitosan that is compatible with disinfection agents and that maintains a good shelf life.

In a first aspect of the present invention, a unique flocculant formulation based on chitosan is described comprising chitosan acids, alcohols and metal salts, minimizing the presence of sulfates.

Another aspect of the present invention refers to a method for the preparation of a unique formulation of flocculant based on chitosan that will allow it to operate simultaneously with disinfection products.

BRIEF DESCRIPTION OF THE DRAWINGS

FIG. 1*a* shows the need to have separately a solid granulate and a liquid activating solution, which, diluted in water, forms the product as it will be used by the final user in accordance with what is described in application MX/a/2020/006789.

FIG. 1*b* shows the presence of a single granulated product, which also when diluted in water, forms the product as it will be used by the final user.

DETAILED DESCRIPTION OF THE PREFERRED EMBODIMENT

Figure 1A:
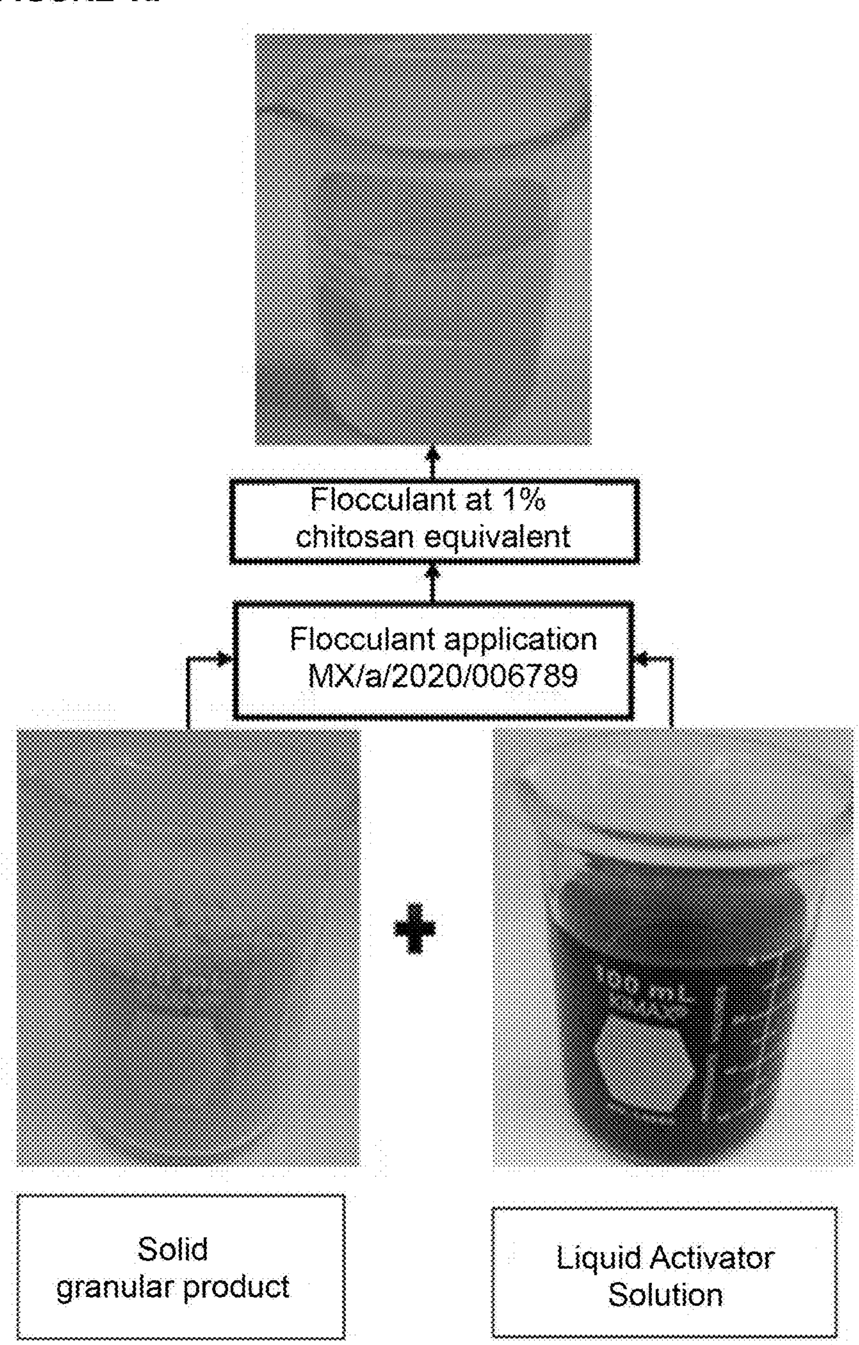
FIG. 1*a*. In line with the prior art.
Figure 1B:
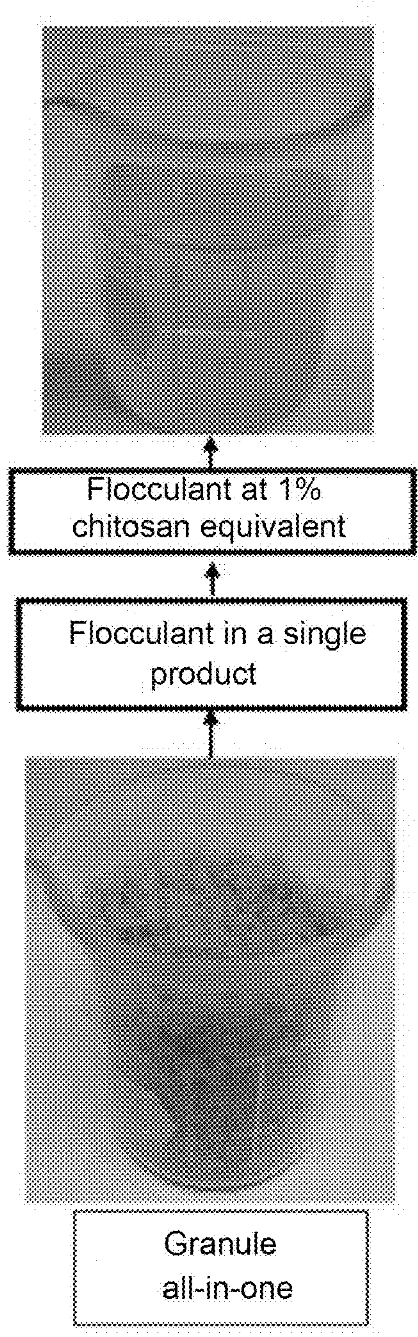
FIG. 1*b*. As a solution to the problems posed by the prior art, in accordance with the present invention.

The present application provides a chitosan-based flocculant in a single product that meets NSF specifications and allows the use of the flocculant simultaneously with disinfection products.

Disinfection product, in the context of the present invention, refers to any substance that reacts with tests and equipment for measuring hypochlorite.

In a preferred embodiment of the invention, the disinfection product comprises chlorine, $Cl_2$, chlorine dioxide, sodium hypochlorite, calcium, potassium, isocyanuric acid, monochloroisocyanuric acid, dichloroisocyanuric acid, trichloroisocyanuric acid, ozone.

In accordance with this aspect of the invention, chitosan refers to granulated chitosan or non-granulated chitosan, being in a concentration less than or equal to 40%, In the present invention, chitosan can be of low weight molecular weight (10,000 to 190,000 g/mol), medium molecular weight (190,000 g/mol to 310,000 g/mol) or high molecular weight (310,000 g/mol to 375,000 g/mol), wherein the chitosan can have a purity based on about 40% dry, about 50% dry, about 60% dry, about 70% dry, about 80% dry, about 85% dry, about 90% dry, or up to about 95% dry.

In a preferred embodiment of the present invention, chitosan has a deacetylation degree of about 65%, about 75%, about 85%, and up to about 95%.

In a preferred embodiment of the present invention, the chitosan is low molecular weight chitosan (10,000 to 190,000 g/mol). In a preferred embodiment of the present invention, the chitosan is medium molecular weight chitosan (190,000 g/mol to 310,000 g/mol). In a preferred embodiment of the present invention, the chitosan is high molecular weight chitosan (310,000 g/mol to 375,000 g/mol).

In a preferred embodiment of the invention, the particle size of the chitosan is in the range of 0.1 mm to 5 mm in diameter. More preferably, the particle size of the chitosan should be less than or equal to 5 mm, preferably less than 1 mm, more preferably less than 0.595 mm. Even more preferably, the particle size of the chitosan should be less than or equal to 0.177 mm.

In a preferred embodiment of the present invention, the chitosan is chitosan purified from biomass of crustaceans.

In one embodiment of the invention, the metal salts are selected from nitrates, chlorides, iodides, phosphates, carbonates, acetates and less preferably metal sulfates such as aluminum, cobalt, manganese, chromium, nickel, iron, copper, silver, gold, zinc, among others independently or in combination.

Preferably, said metal salts should have a purity of at least about 30%, 40%, 50%, 60%, 70%, 80%, 90%, 95% and 99%.

In one embodiment of the invention, the acids are organic acids, inorganic acids, and their mixtures.

In a preferred embodiment of the invention, the organic acids are selected from the group comprising formic, acetic, propionic, butyric, citric, lactic, carbonic acids and its associated salts and/or combinations thereof.

In a preferred embodiment of the invention, the inorganic acids are selected from the group comprising hydrochloric, nitric, phosphoric, sulfuric, hydrofluoric acid and their associated salts and/or combinations between them.

Preferably, said organic and inorganic acids should have a purity of at least about 20%, 30%, 40%, 50%, 60%, 70%, 80%, 90%, 95% and 99%.

In a preferred embodiment of the invention, the alcohols comprise $C_1$-$C_{12}$, preferably $C_1$-$C_8$, more preferably $C_1$-$C_5$.

Preferably, said alcohols should have at least about 70%, 80%, 90%, 95%, or 99% purity.

1) Add water at a temperature between 20-55° C. to a first metal salt and stir for a period of between 1-10 minutes or until a uniform solution is formed;
2) Add a second metal salt, wherein the second metal salt is different from the first metal salt and stir, preferably for 1-5 minutes.
3) Add a third metal salt, wherein the third metal salt is different from the second metal salt and stir, preferably for 1-5 minutes.
4) Add an inorganic acid at a temperature between 15-30° C. and stir, preferably for a period of time between 1-5 minutes.
5) Add an alcohol and stir, preferably for 5-15 minutes, controlling the temperature of the solution so that it is below 35° C.
6) Add an organic acid and stir, preferably for 1-5 minutes, or until the mixture is homogenized.
7) In a separate container with chitosan at a concentration of approximately 60-90% w/w, slowly incorporate into the mixture obtained in step 6);
8) Continue stirring, preferably for a period between 1-10 minutes, and/or until a homogeneous product with a granular appearance is formed.
9) Store in vacuum containers, resistant to corrosion and at a temperature below 25° C. until use.

More specifically, the process for preparing a biopolymer-based flocculant is described by following the mechanism and information below:

Chitosan is a polymer of glucosamine, whose amino group needs to be protonated to be soluble. The protonation can be done with the addition of inorganic and/or organic acids. When amino groups are protonated and change from $—NH_2$ at $—NH_3^+$, chitosan becomes soluble and forms a completely water-soluble gel.

Scheme 1. Protonation reaction of insoluble chitosan until reaching chitosan in soluble form

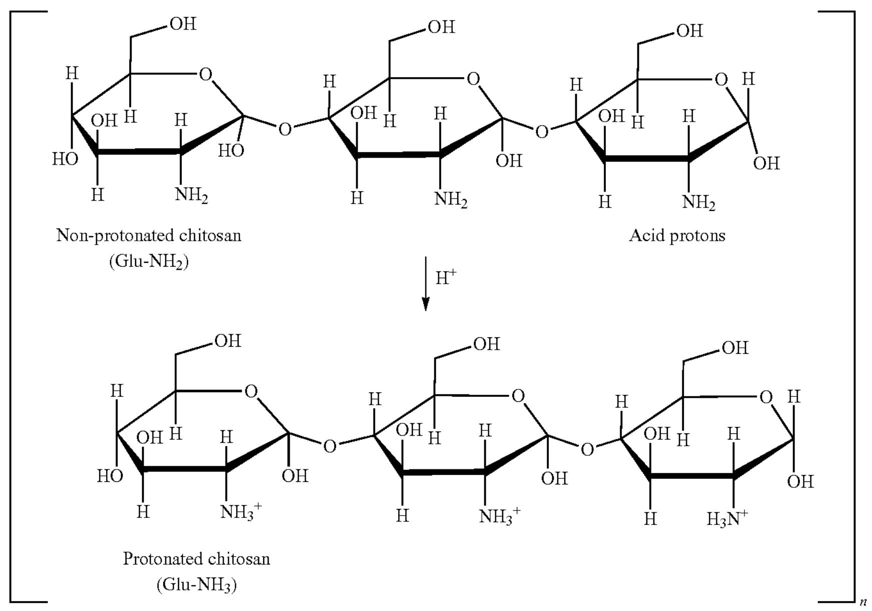

In another aspect of the invention, a process is provided for preparing a biopolymer-based flocculant in accordance with the present invention, wherein the method comprises the following steps:

Although the acid is necessary for the solubilization of chitosan, its use in excess can hydrolyze the glycosidic bond (β 1-4) between glucosamine molecules, which reduces the molecular weight of chitosan and therefore, it reduces its functionality as a flocculant, since the longer this polymer is, the formation of heavy flocs is favored, which improves its effectiveness as a flocculant.

Application MX/a/2020/006789 describes a chitosan-based flocculant that proposes a kit with a solid granulated product and a liquid activating solution to be prepared by the end user. In said invention, metal sulphates are used to counteract the effect of the depolymerization generated by the excess of acid.

Sulfate radicals can join with the hydroxyl groups of glucosamine molecules, repolymerizing the fragments formed by the action of excess acid.

However, in turn, an excess of sulfate groups can modify the equilibrium of the reaction between depolymerization-polymerization and generate closed structures of very high molecular weight that are insoluble in water in pH ranges between 2-8 and temperatures between 4-50° C.

Scheme 2. Re-polymerization of chitosan with sulfate groups.

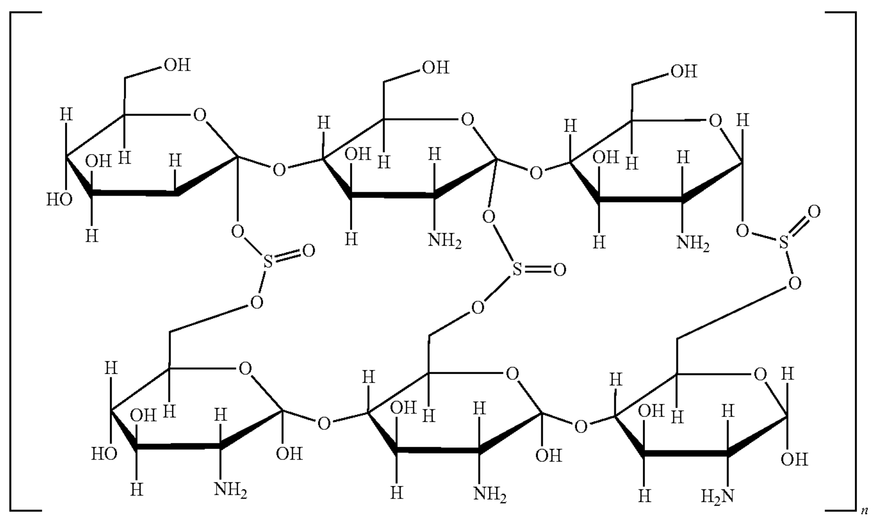

Due to the above, the substitution of sulfates by nitrates of different metals was proposed, preferably cupric nitrate was used, which, when in the presence of HCl, forms nitric acid and copper chloride, which being formed by atoms with a "marked" charge such as (+) and (−), maintain a balance with elemental copper and chloride ions, which, being in an aqueous medium, can react and form copper hydroxide and regenerate hydrochloric acid.

Scheme 3. Reaction of copper hydroxide formation and regeneration of hydrochloric acid.

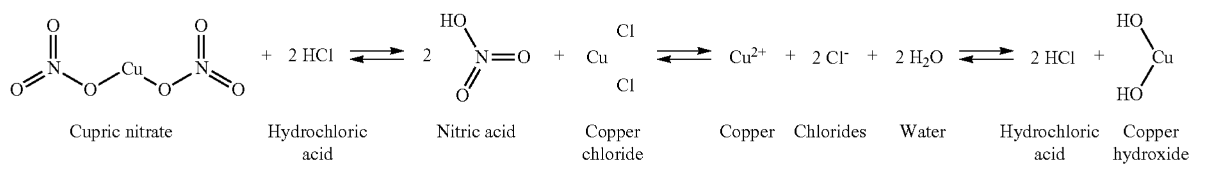

Cupric nitrate    Hydrochloric acid    Nitric acid    Copper chloride    Copper    Chlorides    Water    Hydrochloric acid    Copper hydroxide From the formation of nitric acid, this acid dissociates and its nitrate group now interacts with chitosan performing the function of re-polymerization as shown in scheme 4, however and unlike the sulfate groups, the nitrate groups form interactions that do not completely close the structure, which maintains its solubility in water, with which an all-in-one product can be obtained, without problems of solubilization in water and that at being in acidic conditions allows maintaining the integrity of the molecular weight of chitosan and therefore its effectiveness as a flocculant.

Scheme 4. Re-polymerization of chitosan with nitrate groups.

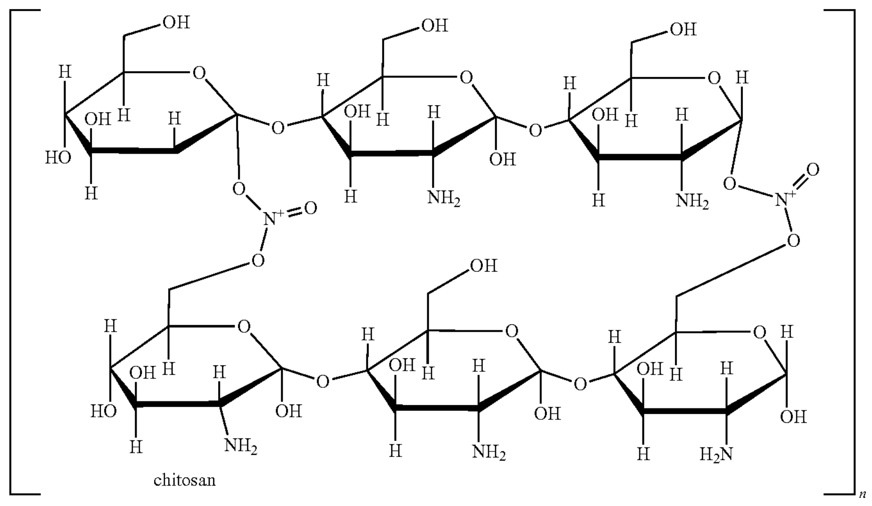

chitosan

Other reagents used to stabilize the chitosan structure were chlorides, preferably ferric chloride, which is also in equilibrium in its ionic form and which, when in an aqueous medium, can also form ferric hydroxide, as well as regenerating the hydrochloric acid necessary for the correct solubilization of chitosan (Scheme 5).

Scheme 5. Reaction of formation of ferric hydroxide and regeneration of hydrochloric acid

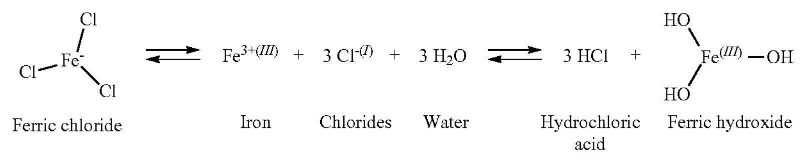

Ferric chloride

Iron

Chlorides

Water

Hydrochloric acid

Ferric hydroxide

Additionally, the addition of an alcohol with less than 5 carbons, preferably ethanol, was proposed, which, when in contact with the copper and/or iron hydroxide (Scheme 3 and 5), can be initially oxidized to an aldehyde and then to acetic acid, which is the organic acid with the best affinity to solubilize chitosan. The addition of alcohol allows to modify the balance of the reaction towards this controlled oxidation, and, therefore, to reduce the chlorination of the amino groups present in the chitosan, which allows its protonation and therefore solubilization of chitosan (Scheme 6).

Scheme 6. Oxidation reaction of ethanol to acetic acid.

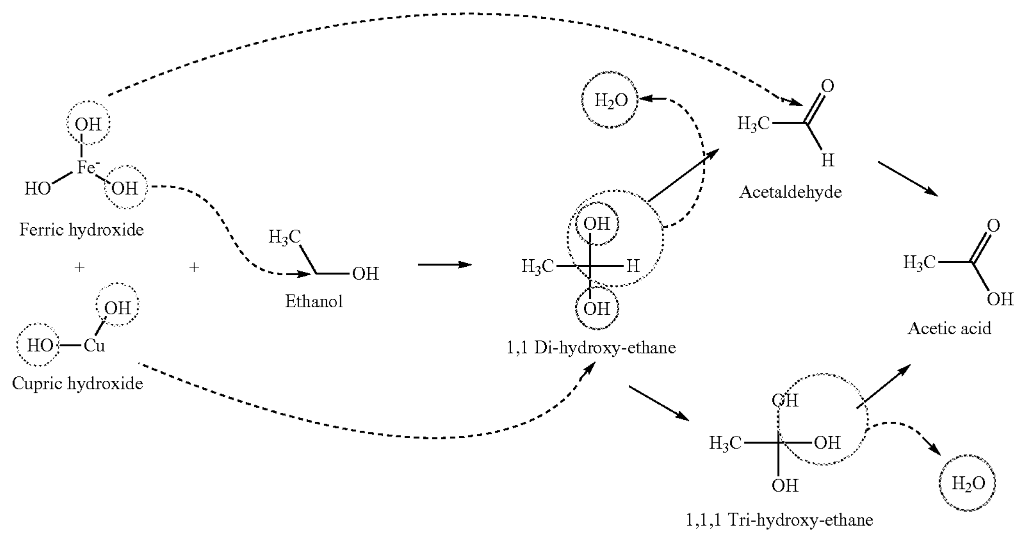

In order to improve the understanding of the present invention, the following examples are listed:

Example 1. Preparation of the Flocculant

1) Weigh 714 g of cupric nitrate with purity equal to or greater than 90%,
2) Add 510 g of tap water at a temperature between 20-55° C. and leave stirring for a period between 1-10 minutes or until a uniform solution is formed.
3) 3570 g of hydrochloric acid at 32% purity w/v or its equivalent at other concentrations are added at a temperature below 30° C. and left stirring for a period of time between 1-5 minutes.
4) 714 g of ferric chloride at 40% purity w/w or its equivalent in other concentrations are added and it is left stirring for 1-5 minutes.
5) 1408 g of 98% pure ethyl alcohol or its equivalent are added and left stirring for 5-15 minutes, controlling the temperature of the solution so that it is below 35° C.
6) Incorporate 224 g of acetic acid with a purity of 98% or its equivalent in another concentration, and stir for 1-5 minutes or until the solution is homogenized.
7) In a mechanical stirrer with blades or similar, 3,060 g chitosan with a deacetylation degree greater than or equal to 70%, with a molecular weight equal to or greater than 22000 g/mol and purity greater than or equal to at 70% and a particle size of less than 0.595 mm and leave stirring between 20-40 rpm until homogenized.
8) The solution of metals and acids is gradually incorporated into the chitosan at a rate of 0.01-0.02 mL of solution/g chitosan per second, and after all the solution has been added, it is left stirring for a period between 1-10 minutes and/or until a homogeneous product with a granular appearance is formed.
9) The product is transferred to plastic bags from which the air present is removed and kept in storage at a temperature below 25° C. until use. Despite the increased cost of the reagents used in the all-in-one flocculant/compatible with disinfection agents described in this application, these were compensated due to the decrease in man-hours, use of equipment, as well as to the reduction of packaging material and freight costs, which added together resulted in a cost-competitive product compared to the two separate products of application MX/a/2020/006789.

Example 2. Dosage and Use

With the help of a triple beam balance, 770 g of the flocculant were weighed in a bucket, to which 10 L of tap water were added and mixed until the flocculant dissolved, the previously prepared predilution was added to a jug and made up to 50 L with tap water.

The concentration of the flocculant is 0.462 ppm chitosan equivalent, for use in the Campo La Paloma water treatment plant located in Los Mochis, Sinaloa, Mexico, with a capacity of 173 $m^3$/day, a tank volume of flocculation of 2.66 $m^3$ and a residence time of 0.9 hours.

The dosing was carried out with a pair of peristaltic pumps, one for the flocculant at a rate of 3 ppm and another to dose sodium hypochlorite at a rate of 4 ppm and the quality of the water was analyzed at the inlet and outlet of the purification system, as well as after the silica gel and activated carbon filter system.

The samples were analyzed with the help of a turbidity meter (LTLutron—Turbidity Meter, Model TU-2016, Taiwan) using tridistilled water as blank.

Figure 2:
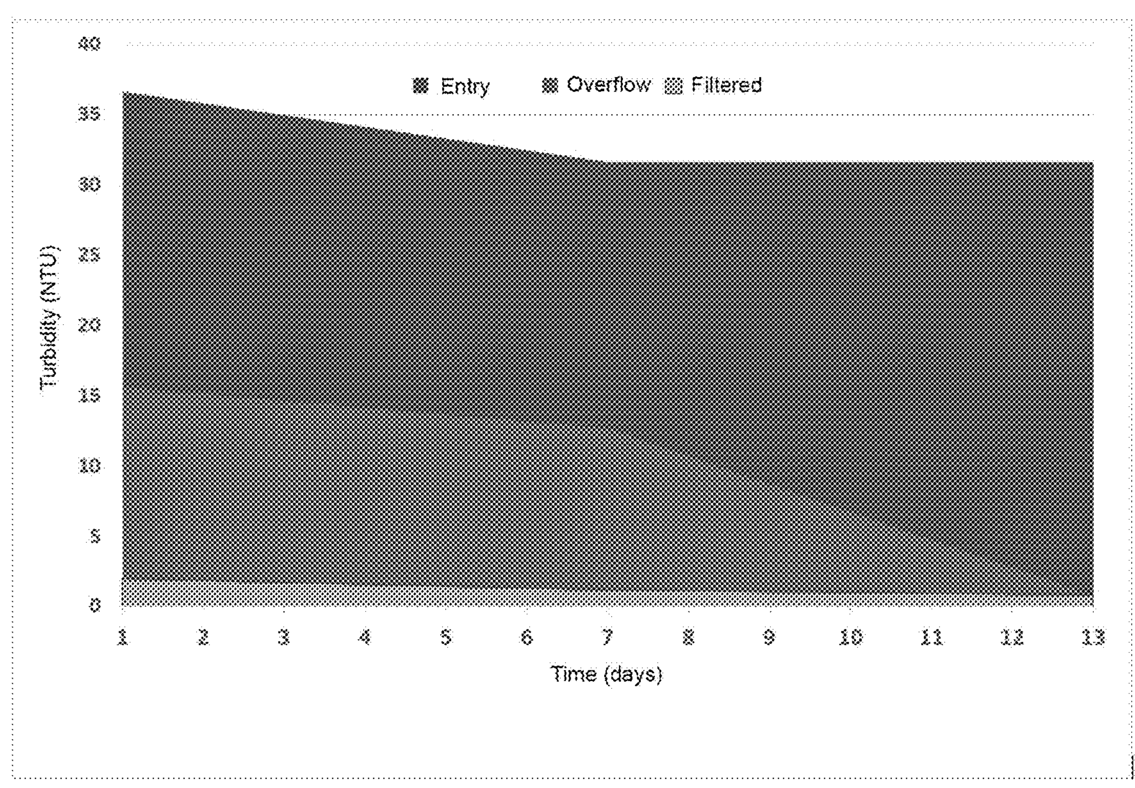
FIG. 2. Graphically shows the evaluation results of the turbidity in the inlet water, overflow and after the filter system, taken in a water treatment plant located in Campo la Paloma, Ahome Sinaloa, during a period of 13 days.
Figure 3:
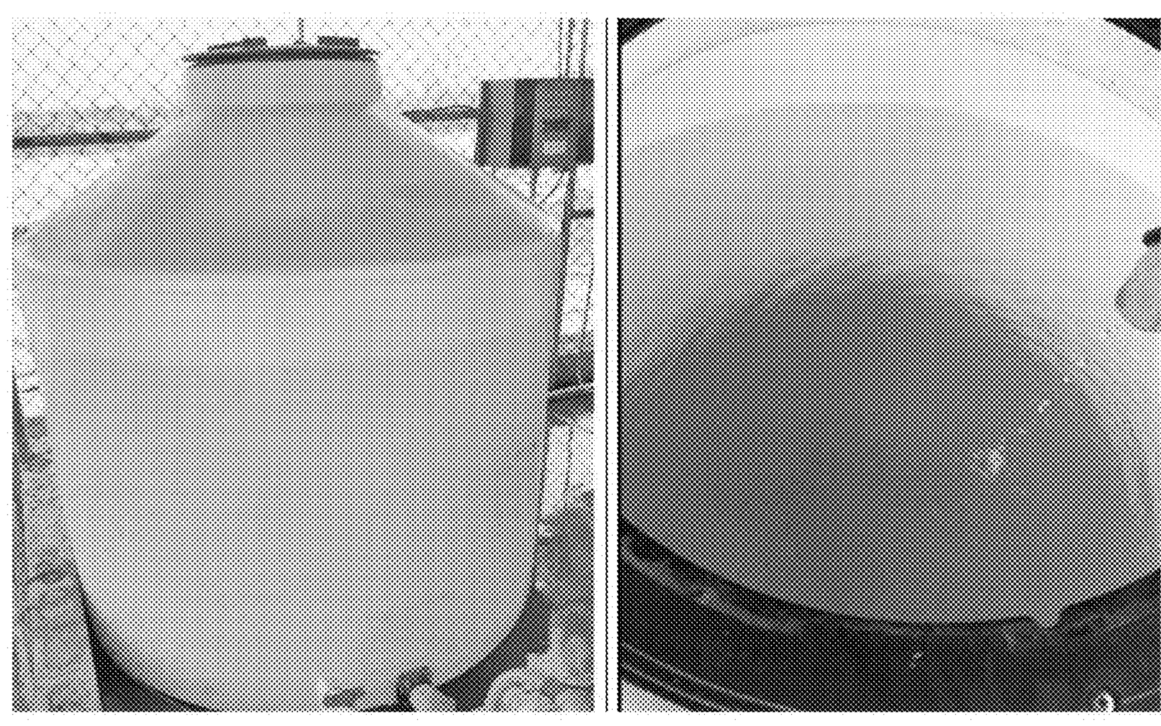
FIG. 3. Represents water treated with flocculant after filters.

In these it can be seen that the input turbidity value is consistent in a value between 36.6-31.2 NTU (FIG. 2). In the same way, the decrease in this turbidity between 15.9 to 0.8 NTU of the overflow flocculated water is consistent, the decrease to 0.8 NTU when rest times were greater than 12 hours and once the water passed through the silica and activated carbon filter system was observed, the turbidity of the water between 1.2 and 0.8 NTU, which implies a reduction in turbidity between 97% and 98.5% with respect to the input value, water quality that can be seen in FIG. 3.

The present application of the chitosan-based flocculant/coagulant allowed the easy dissolution of the granulate all-in-one instead of a granulated product A and an activating solution B, without sacrificing the concentration of chitosan, in addition, this version was designed so that the reagents of its formulation were within the list allowed by the NSF, as well as with purchase availability at an industrial level.

In the same way, the flocculant/coagulant is compatible with certain disinfection agents with which drinking water could be obtained that could meet the limits established in NOM-127-SSA1-1994.

Example 3

1) Weigh 469.2 g of cupric nitrate with purity equal to or greater than 90%,
2) Add 673.2 g of tap water at a temperature between 20-55° C. and leave stirring for a period between 1-10 minutes or until a uniform solution is formed.
3) 122.4 g of ammonium sulfate with a purity of at least 90% are added and left under stirring for a period between 1-10 minutes or until a uniform solution is formed.
4) 377.4 g of ferric chloride at 40% purity w/w or its equivalent in other concentrations are added and it is left stirring for 1-5 minutes.
5) Add 3,315 g of nitric acid with a purity of 54% w/v or its equivalent to other concentrations at a temperature below 30° C. and leave stirring for a period of time between 1-5 minutes.
6) Incorporate 448.9 g of acetic acid with a purity of 98% or its equivalent in another concentration, and stir for 1-5 minutes or until the solution is homogenized.
7) In a mechanical stirrer with blades or similar, 3,060 g of chitosan with a deacetylation degree greater than or equal to 70%, with a molecular weight equal to or greater than 22,000 g/mol and purity greater than or equal to 70%
8) Immediately add 1,734 g of sodium chloride and leave stirring between 20-40 rpm for 1 minute.
9) The solution of metals and acids is incorporated little by little into the mixture of chitosan and sodium chloride at a rate of 0.01-0.02 mL of solution/g chitosan per second, and after adding all the solution, it is left stirring for a period between 1-10 minutes and/or until a homogeneous product with a granulated appearance is formed.
10) The product is transferred to plastic bags which are recommended to remove the air present and keep in storage at a temperature below 25° C. until use.

Example 4

1) Weigh 1233 g of cupric nitrate with purity equal to or greater than 90%,
2) Add 2200 g of tap water at a temperature between 20-55° C. and leave stirring for a period between 1-10 minutes or until a uniform solution is formed.
3) 400 g of ammonium sulfate with a purity of at least 90% are added and left under stirring for a period between 1-10 minutes or until a uniform solution is formed.
4) 1,233 g of ferric chloride at 40% purity w/w or its equivalent in other concentrations are added and it is left stirring for 1-5 minutes.
5) Add 10,667 g of hydrochloric acid with a purity of 32% w/v or its equivalent to other concentrations at a temperature below 30° C. and leave stirring for a period of time between 1-5 minutes.
6) Incorporate 1,466.7 g of acetic acid with a purity of 98% or its equivalent in another concentration, and stir for 1-5 minutes or until the solution is homogenized.
7) In a mechanical stirrer with blades or similar, 10,000 g of chitosan with a deacetylation degree greater than or equal to 70%, with a molecular weight equal to or greater than 22,000 g/mol and purity greater than or equal to 70%
8) Immediately add 333 g of calcium chloride and leave stirring between 20-40 rpm for 1 minute.
9) The solution of metals and acids is incorporated little by little into the mixture of chitosan and calcium chloride at a rate of 0.01-0.02 mL of solution/g chitosan per second, and after adding all the solution, it is left stirring for a period between 1-10 minutes and/or until a homogeneous product with a granulated appearance is formed.
10) The product is transferred to plastic bags which are recommended to remove the air present and keep in storage at a temperature below 25° C. until use.

Example 5

1) Weigh 425 g of cupric nitrate with purity equal to or greater than 90%,
2) Add 299 g of tap water at a temperature between 20-55° C. and leave stirring for a period between 1-10 minutes or until a uniform solution is formed.
3) 161 g of copper sulfate with a purity of at least 90% are added and left under stirring for a period between 1-10 minutes or until a uniform solution is formed.
4) 425 g of ferric chloride at 40% purity w/w or its equivalent in other concentrations are added and it is left stirring for 1-5 minutes.
5) Add 4,525 g of hydrochloric acid with a purity of 32% w/v or its equivalent to other concentrations at a temperature below 30° C. and leave stirring for a period of time between 1-5 minutes.
6) Incorporate 253 g of acetic acid with a purity of 98% or its equivalent in another concentration, and stir for 1-5 minutes or until the solution is homogenized.
7) In a mechanical stirrer with blades or similar, 3450 g of chitosan with a deacetylation degree greater than or equal to 70%, with a molecular weight equal to or greater than 22,000 g/mol and purity greater than or equal to 70%
9) The solution of metals and acids is gradually incorporated into the chitosan at a rate of 0.01-0.02 mL of solution/g chitosan per second, and after all the solution has been added, it is left stirring for a period between 1-10 minutes and/or until a homogeneous product with a granular appearance is formed.
10) The product is transferred to plastic bags which are recommended to remove the air present and keep in storage at a temperature below 25° C. until use.

Example 6

1) Weigh 2,494.8 g of sodium chloride with a purity of at least 90%.
2) Add 8,309.7 g of tap water at a temperature between 20-55° C. and leave stirring for a period between 1-10 minutes or until a uniform solution is formed.
3) Weigh 3331 g of cupric nitrate with purity equal to or greater than 90% and leave it stirring for a period between 1-10 minutes or until a uniform solution is formed.

4) 611.6 g of ferric chloride at 40% purity w/w or its equivalent in other concentrations are added and it is left stirring for 1-5 minutes.
5) Add 9,980.3 g of hydrochloric acid with a purity of 32% w/v or its equivalent to other concentrations at a temperature below 30° C. and leave stirring for a period of time between 1-5 minutes.
6) 9,350.3 g of acetic acid with a purity of 98% or its equivalent in another concentration are incorporated, and it is stirred for 1-5 minutes or until the solution is homogenized.
7) In a mechanical stirrer with blades or similar, 16,464 g of chitosan with a deacetylation degree greater than or equal to 70%, with a molecular weight equal to or greater than 22,000 g/mol and purity greater than or equal to 70%
8) Immediately add 1,958.3 g of calcium chloride and leave stirring between 20-40 rpm for 1 minute.
9) The solution of metals and acids is incorporated little by little into the mixture of chitosan and calcium chloride at a rate of 0.01-0.02 mL of solution/g chitosan per second, and after adding all the solution, it is left stirring for a period between 1-10 minutes and/or until a homogeneous product with a granulated appearance is formed.
10) The product is transferred to plastic bags which are recommended to remove the air present and keep in storage at a temperature below 25° C. until use.

Example 7

1) Weigh 349.3 g of calcium chloride with a purity of at least 90%.
2) Add 1,163.4 g of tap water at a temperature between 20-55° C. and leave stirring for a period between 1-10 minutes or until a uniform solution is formed.
3) Weigh 466.4 g of cupric nitrate with purity equal to or greater than 90% and leave under stirring for a period between 1-10 minutes or until a uniform solution is formed.
4) 85.6 g of ferric chloride at 40% purity w/w or its equivalent in other concentrations are added and it is left stirring for 1-5 minutes.
5) Add 1,397.2 g of hydrochloric acid with a purity of 32% w/v or its equivalent to other concentrations at a temperature below 30° C. and leave stirring for a period of time between 1-5 minutes.
6) Incorporate 1309 g of acetic acid with a purity of 98% or its equivalent in another concentration, and stir for 1-5 minutes or until the solution is homogenized.
7) In a mechanical stirrer with blades or similar, 2,305 g of chitosan with a deacetylation degree greater than or equal to 70%, with a molecular weight equal to or greater than 22,000 g/mol and purity greater than or equal to 70%
8) Immediately add 274.2 g of calcium chloride and leave stirring between 20-40 rpm for 1 minute.
9) The solution of metals and acids is incorporated little by little into the mixture of chitosan and calcium chloride at a rate of 0.01-0.02 mL of solution/g chitosan per second, and after adding all the solution, it is left stirring for a period between 1-10 minutes and/or until a homogeneous product with a granulated appearance is formed.
10) The product is transferred to plastic bags which are recommended to remove the air present and keep in storage at a temperature below 25° C. until use.

Example 8

1) Weigh 5.0 g of potassium chloride with a purity of at least 90%.
2) Add 2.6 g of tap water at a temperature between 20-55° C. and leave stirring for a period between 1-10 minutes or until a uniform solution is formed.
3) Weigh 6.7 g of cupric nitrate with purity equal to or greater than 90% and leave under stirring for a period between 1-10 minutes or until a uniform solution is formed.
4) 1.2 g of ferric chloride at 40% purity w/w or its equivalent in other concentrations are added and it is left stirring for 1-5 minutes.
5) Add 0.5 g of dibasic potassium phosphate with a purity of 98% w/w or its equivalent in other concentrations and leave stirring for 1-5 minutes.
6) Add 20 g of hydrochloric acid with a purity of 32% w/v or its equivalent to other concentrations at a temperature below 30° C. and leave stirring for a period of time between 1-5 minutes.
7) Incorporate 18.7 g of acetic acid with a purity of 98% or its equivalent in another concentration, and stir for 1-5 minutes or until the solution is homogenized.
8) In a mechanical stirrer with blades or similar, 47.4 g of chitosan are incorporated with a deacetylation degree greater than or equal to 70%, with a molecular weight equal to or greater than 22,000 g/mol and a purity greater than or equal to to 70%
9) Immediately add 2.9 g of calcium chloride and leave stirring between 20-40 rpm for 1 minute.
10) The solution of metals and acids is incorporated little by little into the mixture of chitosan and calcium chloride at a rate of 0.01-0.02 mL of solution/g chitosan per second, and after Adding all the solution, it is left stirring for a period between 1-10 minutes and/or until a homogeneous product with a granulated appearance is formed.
11) The product is transferred to plastic bags which are recommended to remove the air present and keep in storage at a temperature below 25° C. until use.

Example 9

Figure 4:
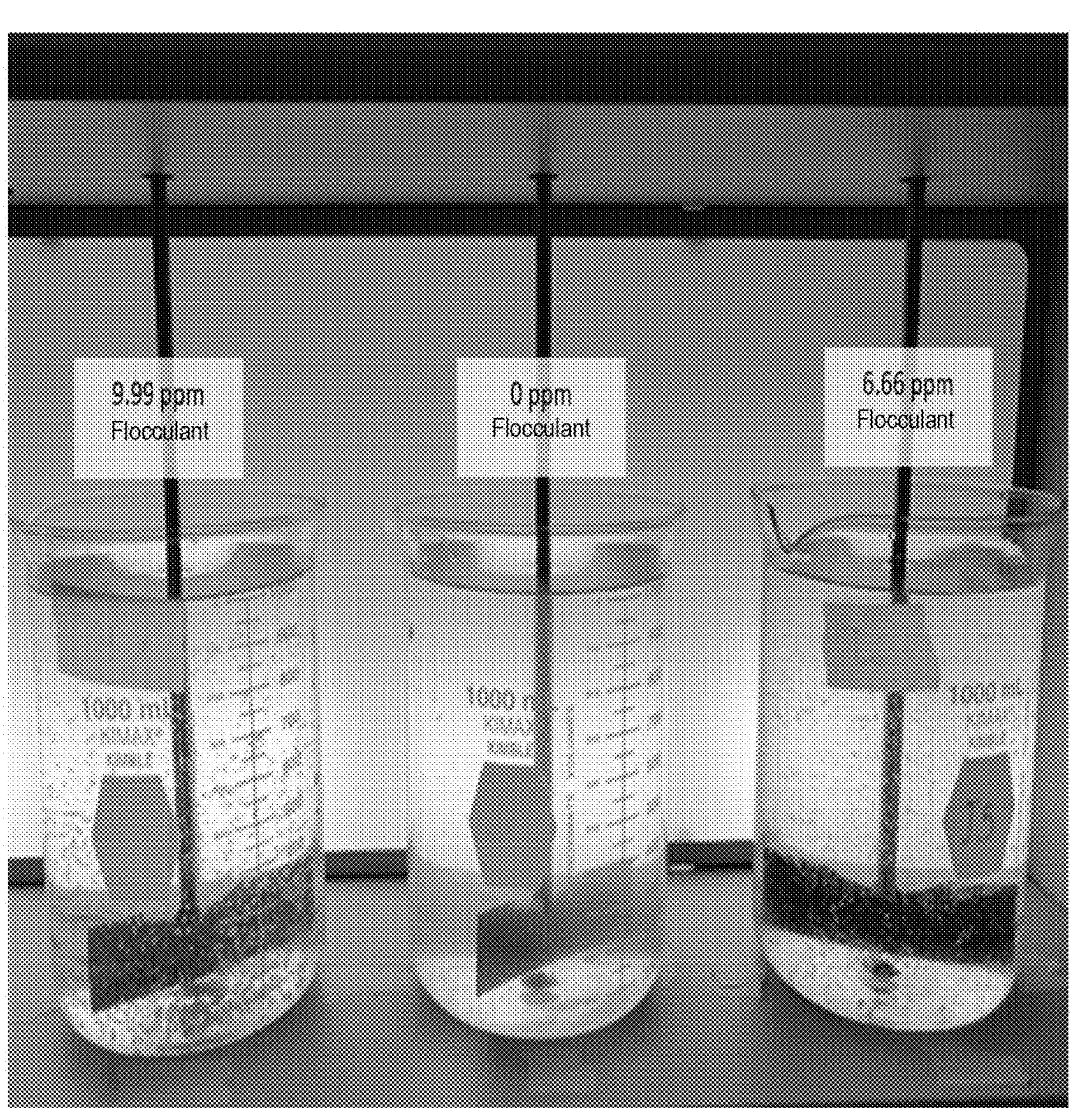
FIG. 4. Represents the jar test with chitosan-based flocculant at doses of 6.66 and 9.99 ppm compared to the control, in which the formation of floccules can be observed.

A 20 L sample of raw water was taken from the Canal Lateral 18 from the Presa Miguel Hidalgo (El Fuerte, Sinaloa, Mexico) in the Industrial Zone of Los Mochis-Sinaloa, Mexico during the month of January 2021, with a turbidity of 30.52 NTU (Nephelometric Units) and initial pH of 7.2, two 1,000 mL water samples were taken and the Bioflocculant was added, previously diluted to 3.33% for a concentration of 6.66 and 9.99 ppm (FIG. 4), in parallel, another water sample was taken as a negative control to which no type of flocculant was added, followed by a jar test (yelp Scientifica, jlt 6 series) with the following times and cycles: 1 minute at 100 RPM, 14 minutes at 40 RPM, and 15 minutes off.

At the end of the rest time, at a depth of 2 cm from the surface of the flasks with the treated water, a 15 mL sample was taken from each treatment and the turbidity of each was analyzed with the help of a turbidity meter (LTLutron- Turbidity Meter, Model TU-2016, Taiwan) with a 10 mL glass cell, using tridistilled water as a blank (HYCEL, Jalisco, Mexico).

The water treated with the flocculant showed a turbidity of 0.70 NTU with a dose of 9.99 ppm; additionally, it was observed that the size of the flocs formed was at least 4 times greater.

Various modifications of the invention, in addition to those described herein, will be apparent to those skilled in the art from the foregoing description. Such modifications are also intended to be within the scope of the appended claims. Each reference, including without limitation all patents, patent applications, and publications, cited in this application is hereby incorporated by reference in its entirety.

What is claimed is:

1. A flocculant comprising:

chitosan at a concentration less than or equal to 40% (w/w) as a dry basis, a first metal salt, a second metal salt and a third metal salt, wherein each of the first, second and third metal salts is selected from the group consisting of nitrates, chlorides, iodides, phosphates, carbonates, acetates, and sulfates, wherein a metal of each of the first, second and third metal salts is selected from the group consisting of aluminum, cobalt, manganese, chromium, nickel, iron, copper, silver, gold, and zinc, independently or in combination;

an organic acid selected from the group consisting of formic, acetic, propionic, butyric, citric, lactic, carbonic acid, and a combination thereof;

an inorganic acid selected from the group consisting of hydrochloric, nitric, phosphoric, sulfuric, hydrofluoric acid, and a combination thereof; and an alcohol selected from alcohols comprising $C_1$-$C_{12}$, wherein the flocculant is prepared by a method comprising:

i) adding water at a temperature between 20-55° C. to the first metal salt and stirring until a uniform solution is formed;

ii) adding the second metal salt, wherein the second metal salt is different from the first metal salt and stirring until a uniform solution is formed;

iii) adding the third metal salt, wherein the third metal salt is different from the first and second metal salts and stirring until a uniform solution is formed;

iv) adding the inorganic acid at a temperature between 15-30° C. and stirring until a uniform solution is formed;

v) adding the alcohol and stirring until a uniform solution is formed controlling the temperature of the solution so that it is below 35° C.;

vi) adding an organic acid and stirring until a uniform solution is formed or until the mixture is homogenized;

vii) in a separate container with chitosan at a concentration of approximately 60-90% w/w, slowly incorporating into the mixture obtained in said vi); and viii) continuing stirring until a homogeneous product with a granular appearance is formed.

2. The flocculant according to claim 1, wherein the chitosan is medium molecular weight chitosan.

3. The flocculant according to claim 1, wherein the chitosan has a purity greater than or equal to 40% (w/w) dry basis.

4. The flocculant according to claim 1, wherein the chitosan has a deacetylation degree greater than or equal to 70%.

5. The flocculant according to claim 1, wherein the chitosan has a particle size from 0.595 mm to 5 mm.

6. The flocculant according to claim 1, wherein the organic acid is selected from acetic acid and propionic acid.

7. The flocculant according to claim 1, wherein the inorganic acid is selected from nitric and hydrochloric acid.

8. The flocculant according to claim 1, wherein the alcohol is selected from ethanol and propanol.

* * * * *